L. L. GREGG.
LUMBER JACK'S PLATFORM.
APPLICATION FILED SEPT. 15, 1919.
1,407,651.
Patented Feb. 21, 1922.
2 SHEETS—SHEET 2.
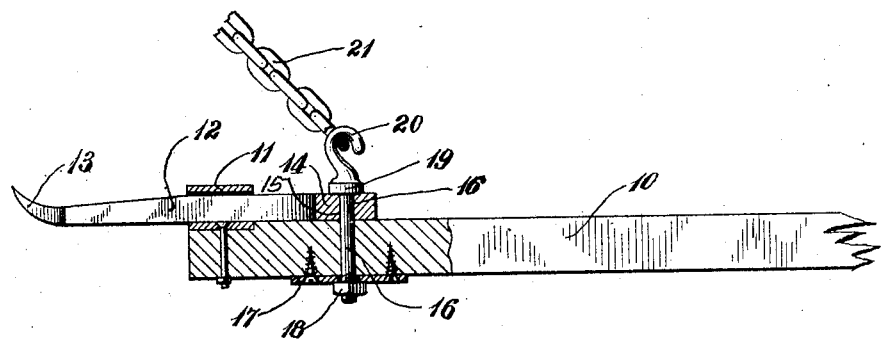
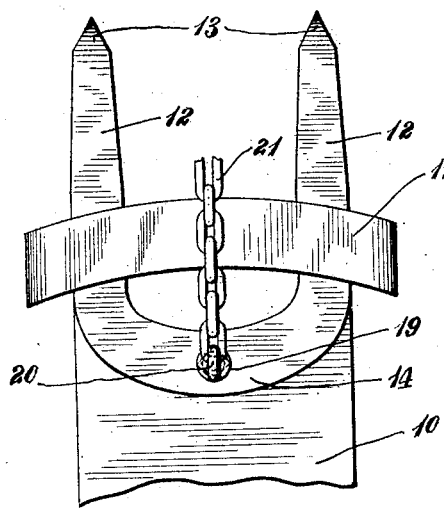
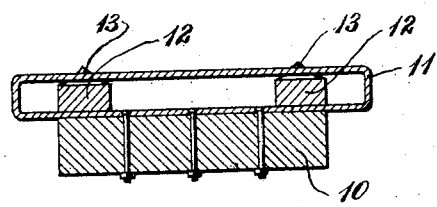
WITNESS:
Benjamin Kahn.
INVENTOR.
BY Lucien L. Gregg
Victor J. Evans
ATTORNEY.

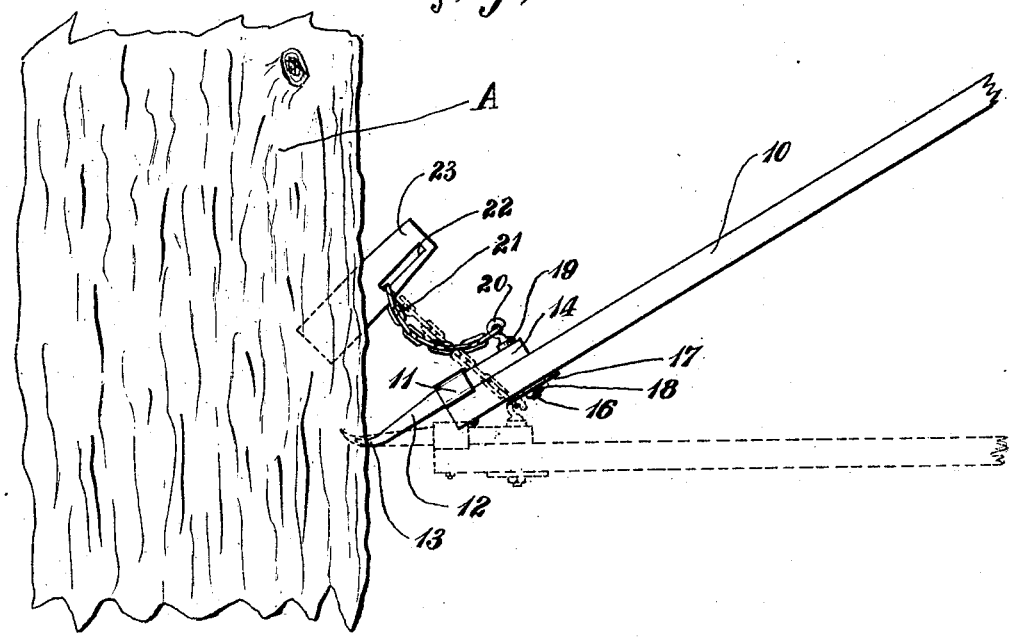
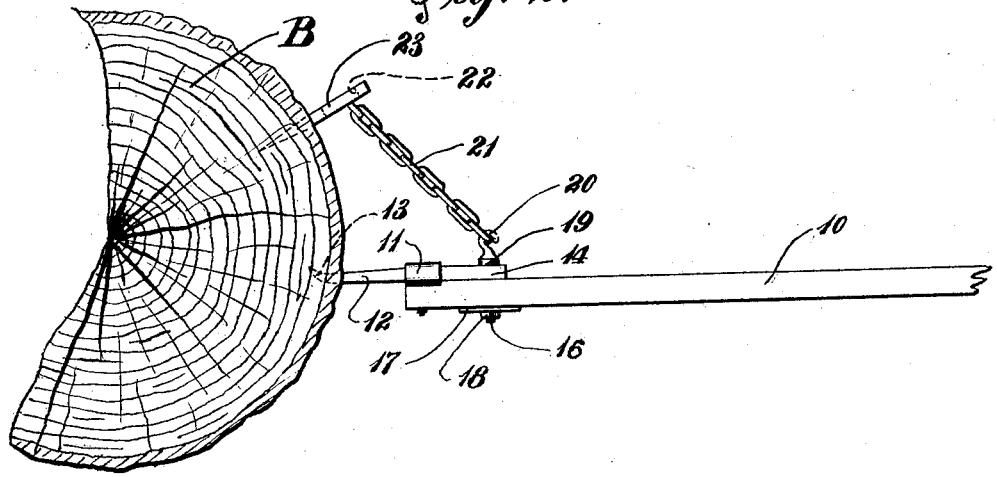

UNITED STATES PATENT OFFICE.

LUCIEN L. GREGG, OF OLYMPIA, WASHINGTON.

LUMBER-JACK'S PLATFORM.

1,407,651.  Specification of Letters Patent.  Patented Feb. 21, 1922.

Application filed September 15, 1919. Serial No. 323,682.

*To all whom it may concern:*

Be it known that LUCIEN L. GREGG, a citizen of the United States, residing at Olympia, in the county of Chehalis and State of Washington, have invented new and useful Improvements in Lumber-Jacks' Platforms, of which the following is a specification.

This invention relates to devices used in lumbering and has for its object the provision of a platform structure which may be quickly and easily engaged upon a tree, whether the tree be standing or whether it has been felled, the device being for the purpose of providing a steady and properly disposed platform upon which an operator may stand while felling the tree or upon which he may stand while cutting the tree after it is felled.

In mountainous districts it is well known that owing to the fact that the trees are on an incline it is difficult for an operator to find proper footing while felling a tree and when the tree is felled the tree is often many feet above the ground as the top may be caught in brush and as the tree may be lying across a small ravine. In such cases it is also difficult for an operator to find a place upon which to stand while sawing the tree into lengths. It is with the above facts in view that the present invention has been designed.

An important object is the provision of a device of this character which is relatively small so that it may be readily transported from place to place and which is in the nature of a platform carrying at one end penetrating prongs adapted for engagement within the trunk of a tree, these prongs being forced strongly into the tree by the operator upon the platform, the device further including a brace member adapted to be driven into the tree and connected with the platform by a chain.

Another object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which, Figure 1 is a side elevation of my device in position upon a standing tree, the initial position being shown in full lines and the final position being shown in dotted lines, Figure 2 is a similar view showing the device in position upon a fallen tree, Figure 3 is a longitudinal sectional view of the device, Figure 4 is a plan view, and Figure 5 is a detail cross sectional view.

Referring more particularly to the drawings, the letter A designates a standing tree and B designates a fallen tree. In carrying out my invention I provide a platform member 10 which is formed from any suitable lumber such as a two inch plank and which may be of any desired length. Secured upon the top of the platform 10 at one end thereof, is a guide bracket 11 which is preferably curved and which is formed as a horizontally extending loop which has its lower length preferably recessed into the top of the platform. Disposed upon the top of the platform and extending through the guide bracket 11 is a U-shaped prong 12 which has its ends provided with slightly upwardly curved penetrating points 13 and which has its bight portion provided with a hole 15 through which extends a bolt 16 extending through the platform 10 and through a washer 17 secured upon the underside thereof. The clamping nut 18 is threaded upon the lower end of the bolt 16 for holding the prong member 12 in position. The upper end of the bolt 16 is formed with a shoulder 19 engaging upon the top of the bight portion 14 of the prong and is also formed with a hook 20 within which is engaged one end of a chain 21 which has its other end engaged within a slot 22 in a wedge member 23 adapted to be driven into a tree.

In the use of the device, referring to Figure 1, it will be seen that the wedge member 23 is driven into the standing tree at the proper point and the platform member is so disposed that the points 13 of the prong member 12 will engage against the tree beneath the wedge member 23. The operator then pulls downwardly upon the platform 10 whereupon the parts will be disposed as shown by dotted lines in Figure 1, the platform being in horizontal position. The operator of course then stands upon the platform while working upon the tree and his weight will force the penetrating points 13 firmly into the tree. Owing to the fact that the guide bracket 11 is of greater length than the width of the prong member 12 it will be seen that a certain amount of relative movement is provided so that the platform may properly adjust itself when the weight of the operator is placed upon it and binding be prevented.

Referring to Figure 2 is will be seen that the device is clearly well adapted for disposition upon the trunk of a fallen tree and the application in this case is exactly the same except that the wedge member 23 is disposed at right angles to the position shown in Figure 1, it being of course understood that this wedge member must extend along the grain of the wood.

From the foregoing description and a study of the drawings it will be apparent that I have thus provided a simply constructed device which may be attached either upon standing or fallen trees and it will also be evident that the device will efficiently perform all of the functions for which it is intended.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:—

1. A device of the character described comprising an elongated platform, a horizontally disposed guide bracket secured upon one end thereof, a U-shaped prong member extending through said bracket and pivoted upon said platform, a wedge member adapted to be driven into a tree, and a flexible member connected with said wedge member and with said platform.

2. A device of the character described comprising an elongated platform, a transverse horizontal guide bracket secured upon one end thereof, a U-shaped prong member disposed upon said platform and extending through said guide bracket, a pivot bolt extending through the bight portion of said prong member and through said platform whereby the prong member and platform may have relative pivotal movement, a wedge member adapted to be driven into a tree, and a flexible member connected at one end with said wedge member and at its other end with said bolt.

3. A device of the character described comprising an elongated platform, a guide bracket secured upon one end of said platform, a U-shaped prong member disposed upon said platform and extending through said guide bracket, said prong member being of less width than the length of said guide bracket, and the bight portion of said prong member being provided with a hole, a pivot bolt extending through said hole and through said platform, the upper end of said bolt being formed with a shoulder and bearing upon said bight portion and also being formed with a hook, a wedge member adapted to be driven into a tree, and a flexible member connected with said wedge member and with said hook.

4. A device of the character described comprising an elongated platform, a horizontally disposed guide member secured upon one end thereof, a prong member extending through said member and pivoted upon the platform, a member adapted to be driven into a tree and means connected with said last named member and with the platform.

In testimony whereof I affix my signature.

LUCIEN L. GREGG.